(12) United States Patent
Subashchandrabose et al.

(10) Patent No.: US 9,235,385 B1
(45) Date of Patent: Jan. 12, 2016

(54) DYNAMIC SOFTWARE ASSEMBLY

(71) Applicant: Apollo Education Group, Inc., Phoenix, AZ (US)

(72) Inventors: Sudhakar Subashchandrabose, San Jose, CA (US); Anil Maipady, San Jose, CA (US); Raghavendra Reddy Mooram, Sunnyvale, CA (US); Shridhar Navanageri, Sunnyvale, CA (US); Narender Vattikonda, San Jose, CA (US)

(73) Assignee: APOLLO EDUCATION GROUP, INC., Phoenix, AZ (US)

( * ) Notice: Subject to any disclaimer, the term of this patent is extended or adjusted under 35 U.S.C. 154(b) by 0 days.

(21) Appl. No.: 14/601,138

(22) Filed: Jan. 20, 2015

(51) Int. Cl.
*G06F 9/44* (2006.01)
*G06F 9/445* (2006.01)

(52) U.S. Cl.
CPC ... *G06F 8/35* (2013.01); *G06F 8/61* (2013.01)

(58) Field of Classification Search
CPC .................................. G06F 8/35; G06F 8/61
USPC .......................................................... 717/107
See application file for complete search history.

(56) References Cited

U.S. PATENT DOCUMENTS

| | | | | |
|---|---|---|---|---|
| 7,451,393 B1* | 11/2008 | Herbison | .......... | G06F 17/30893 715/226 |
| 7,610,233 B1* | 10/2009 | Leong | .................. | G06Q 10/087 705/26.3 |
| 7,958,186 B2* | 6/2011 | Kol | ....................... | G06Q 40/02 709/203 |
| 8,544,016 B2* | 9/2013 | Friedman | ............ | G06F 11/3664 717/107 |
| 8,732,658 B2* | 5/2014 | Plache | ............... | G06B 19/0426 707/758 |
| 8,930,824 B2* | 1/2015 | Bennett | .................. | G06F 9/4443 715/235 |
| 8,990,190 B2* | 3/2015 | Adari | ................ | G06F 17/30867 706/16 |
| 2008/0307337 A1* | 12/2008 | Marinkovich | .... | G06F 17/30274 715/764 |
| 2014/0068551 A1* | 3/2014 | Balasubramanian | ..... | G06F 8/36 717/107 |
| 2014/0335498 A1* | 11/2014 | Muthukumarasamy | . | G09B 7/04 434/350 |

* cited by examiner

*Primary Examiner* — Li B Zhen
*Assistant Examiner* — Theodore Hebert
(74) *Attorney, Agent, or Firm* — Hickman Palermo Becker Bingham LLP (57) ABSTRACT

An improved system and method for providing software is described. The system, upon receiving a software request from a user device, obtains metadata about the user device. Based on the metadata and the software requested, a template of the software is obtained. The template specifies a list of categories, where each category is associated with component(s) in a component database. Based on the metadata and eligibility attributes of the respective components, one component from each category is selected for inclusion in the software. From the selected components and the template, the requested software is constructed and sent to the user device. In some embodiments, for popular user devices, a previously stored selection of components can be accessed. In some embodiments, an updated version of the software is provided if the metadata of the user device changes or if there is a change in the available components or software templates.

18 Claims, 6 Drawing Sheets

DYNAMIC SOFTWARE ASSEMBLY

FIELD OF THE INVENTION

The present invention relates to a system for dynamically assembling software for download, and, more specifically, to assembling the software based on capabilities of the device requesting the software.

BACKGROUND

Many electronic user devices such as laptops, tablets, and smart phones support the installation and execution of applications, or "apps". Apps are software programs that carry out operations to allow a user to perform a specific task. Apps are typically designed based on assumptions about the hardware or software of the devices that will be running the apps. These assumptions can be communicated to the user as system requirements. In many instances, it is incumbent on the user to have prior knowledge about their device and to evaluate the system requirements in relation to the characteristics of their device.

To facilitate installation of software on various types of user devices, application developers offer multiple versions of their software. For example, an application developer offers a version for each of the following operating systems: WINDOWS, ANDROID, iOS etc. In some instances, the application developer specifies particular models of user devices on which each of the versions of the application are configured to run.

Some application vendors (e.g., iTunes, Google Play, Windows Store) are configured to receive a limited amount of data about a user device such as model, operating system, the presence of a particular I/O device (e.g., a front-facing camera or motion sensor). The application vendor can pre-filter the available apps so that only the apps that are likely to be able to be executed by the user device, given what the vendor knows about the user device, are presented to the user. Existing customization of apps is limited to customizing the app based on the available visual display of the device and is based on user preferences. For example, if a user has provided a preference for HD video, then an application vendor can select an HD plugin or component for that download of the app.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

A software provider system facilitates intelligent software construction and causes the software to be downloaded to user devices. A user device requests a software application having a plurality of components. The software provider system selects components to include in the software based, at least in part, on the hardware and software configurations of the user device. The selected components can be assembled according to a software template and delivered to the user device. The software provider system helps to ensure that the software downloaded to the user device is supported by the user device at a specified level of performance.

Embodiments of the software provider system allow users to specify preferences that are further used to select components from a set of available components. The user preferences can include a preference towards lower power consumption, a richer user interface, or regarding some other aspect of the software or its execution. The user preferences can cause the system to set a particular component as a default for the user or to be removed from the pool of components for the user's software.

In some instances, more than one user device has the same configuration. When a software request is received from a user device, the metadata of the user device is compared to stored metadata of other user devices to which the requested software has been sent. If the metadata of the requesting user device matches metadata of a user device from a previous request, a specification provider accesses stored specifications of software previously sent to the other user device. Using the stored specification, the requested software can be constructed and sent to the user device.

In some instances, after the user device has received the requested software, one or more of the user device, the available components, or the template used to construct the requested software can change or be updated. In these instances, an update manager can detect the change and initiate a new software request. The update manager can reside on the user device and/or on the software provider system. The new software request is processed in a similar fashion as the original software request.

Software Provider Architecture

Figure 1:
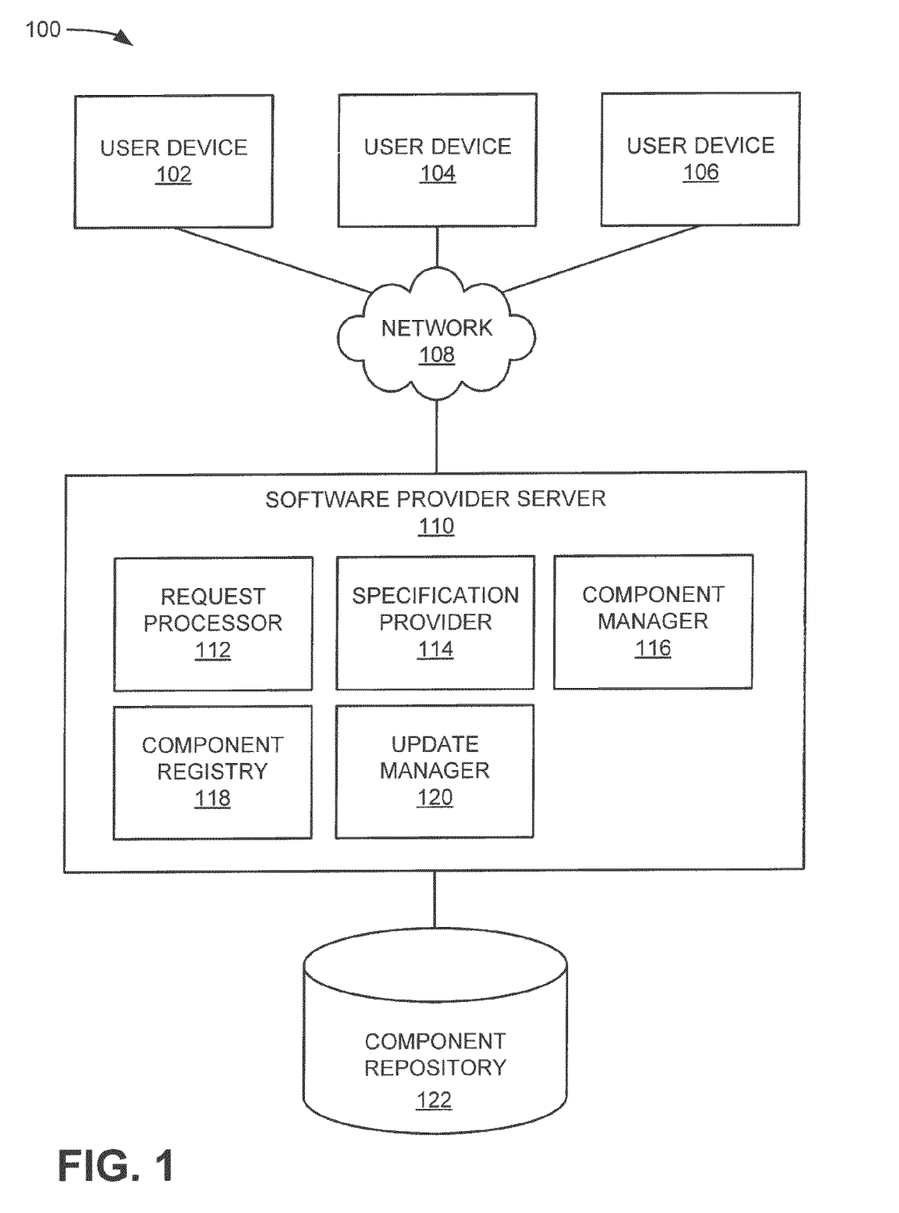
FIG. 1 is a block diagram that depicts an example network arrangement for providing software apps that are assembled based on the capabilities of the user device requesting to download the software.

Techniques are described hereafter for providing requested software to user devices based on the respective characteristics of the user devices. FIG. 1 is a block diagram that depicts an example network arrangement 100 for providing software to the user devices, according to embodiments. Network arrangement 100 includes user devices 102, 104, and 106 and a software provider server 110 that are communicatively coupled via a network 108. Software provider server 110 is also communicatively coupled to a component repository database 122. Example network arrangement 100 may include other devices, including client devices, server devices, and display devices, according to embodiments. For example, one or more of the services attributed to software provider server 110 herein may run on other server devices that are communicatively coupled to network 108.

User devices 102, 104, and 106 can be any type of computing device that is communicatively connected to network 108. Example implementations of user devices 102, 104, and 106 include, without limitation, workstations, personal computers, laptop computers, personal digital assistants (PDAs), tablet computers, video game consoles, cellular telephony devices such as smart phones, and any other type of computing device.

In network arrangement 100, one or more of user devices 102, 104, and 106 can be configured with client-side component managers (not depicted) and client-side update managers (not depicted). The user devices may be configured with other mechanisms, processes and functionalities, depending upon a particular implementation.

Further, respective user devices 102, 104, and 106 are communicatively coupled to one or more display devices (not shown in FIG. 1), for displaying graphical user interfaces, such as graphical user interfaces of an application downloaded from the software provider server 110. Such a display device may be implemented by any type of device capable of displaying a graphical user interface. Example implementations of a display device include a monitor, a screen, a touch screen, a projector, a light display, a display of a tablet computer, a display of a telephony device, a television, etc.

Network 108 may be implemented with any type of medium and/or mechanism that facilitates the exchange of information between a user device and the software provider server 110. Furthermore, network 108 may facilitate use of any type of communications protocol, and may be secured or unsecured, depending upon the requirements of a particular embodiment.

The software provider server 110 may be implemented by any type of computing device that is capable of communicating with a user device over network 108. In network arrangement 100, software provider server 110 is configured with a request processor 112, a specification provider 114, a component manager 116, a component registry 118, and an update manager 120. These functionalities may be part of a cloud computing service, and also may be implemented by one or more logical modules. The software provider server 110 may be configured with other mechanisms, processes and functionalities, depending upon a particular implementation.

The software provider server 110 is communicatively coupled to a component repository database 122. The component repository database 122 maintains one or more components for download in each category identified in a template of requested software. According to embodiments, components reside in memory other than memory associated with component repository database 122, where component manager 116 can access the memory via network 108. Component repository database 122 may reside in any type of storage, including volatile and non-volatile storage (e.g., random access memory (RAM), a removable or disk drive, main memory, etc.), and may be implemented by one or more logical databases. The storage on which component repository database 122 resides may be external or internal to software provider server 110.

User devices 102, 104, and 106 and the modules within the software provider server 110 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication. Further, the user devices and the modules within the software provider server 110 may send one or more such communications over network 108, e.g., to one of the other entities of the system.

Functionality attributed to one or more of software provider server 110 and user devices 102, 104, and 106 may be performed by a different service/client, according to some embodiments. In an embodiment, each of the processes described in connection with one or more of the user devices 102, 104, and 106 and the software provider server 110 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Request Processor

The request processor 112 is configured to receive a request from a user device (e.g., one of user devices 102, 104, and 106) to download software (e.g., an application) to the user device. When the requested software has been downloaded, the user device can execute the software to perform one or more tasks.

The request processor 112 receives the request via the network 108. In some embodiments, the user device from which the request is received is the user device to which the software is to be downloaded. In other embodiments, the request is received from a first user device for download onto a second user device, where the first user device and the second user device can be operated by the same user. The request can be generated by, for example, an app store application installed on the user device (e.g., iTunes, Google Play, or Windows Store). In other instances, the requested is generated by a webpage loaded into a browser on the user device. The request can be pre-generated and an activation link sent to an email mailbox accessible by the user device. Other techniques to generate the request can also be used.

The request processor 112, in response to receiving the request, is configured to obtain metadata about the user device. The metadata comprises one or more of: identification of the user device, the hardware configuration of the user device, the system software configuration of the user device, current state information, user preferences, and known user priorities.

According to embodiments, identification of the user device indicates that the user device is a feature phone, a smart phone, a tablet computer, a laptop computer, or some other type of device.

The hardware configuration metadata includes information such as processor specifications (e.g., 32-bit vs. 64-bit processors), processing speed, memory, working memory, I/O devices (e.g., display device, keyboard, touchpad, camera, motion sensor, GPS), Wi-Fi capability, cellular networking capability, and the like). In some instances, the metadata includes further detailed information about the hardware configuration such as whether a display device is a light emitting diode (LED) display, a retina display, a liquid crystal display (LCD), or another type of display.

The software configuration information includes one or more of: operating system and version, presence of other applications, system settings, etc.

In some instances, current state information of the user device is also obtained by the request processor 112. Current state information comprises one or more of: available working memory, network connection and/or speed, battery remaining, GPS location, etc.

The request processor 112 is configured to obtain user preferences, if available. User preferences include indications such as a preference to preserve power (e.g., extend battery life of the user device), to provide a rich user interface and/or improved usability (e.g., provide text-to-speech capability for visually impaired users), to perform more processing locally rather than remotely (e.g., on a cloud or at a server), to override a particular hardware or software configuration, etc.

In some embodiments, the request processor 112 automatically identifies learned or implicit priorities. Request processor 112 derives such learned priorities from changes made by the user based on previous application downloads. For example, in a software request initiated via the app store, request processor 112 automatically identifies implicit user priorities based on: reviews of other applications in the app store that were submitted by the user; from settings set by the user in the app store; from habits relating to downloading, updating, and running apps already installed on the user device; etc. Examples of learned priorities include a user preference for enhanced security or multi-factor authentication; a preference that the user device read aloud text in, for example, an e-book; a preference that video content be high-definition or have a lower resolution. The request processor may receive input from a client-side component manager and a client-side update manager on the user device. The input describes the current capabilities of the user device and the user's preferences and customization usage data. For example, the incoming data from the user device may indicate that "videocapability=GPUEngine(HD)", and the user's customization usage data may indicate that "videocapability=GPUEngine(SD)." In this case, the request processor 112 can assign a higher priority to the user's customization usage data than the capability data. In the above example), even though the user device supports HD video playback, the request processor 112 may assemble the requested software as including the SD video plugin.

Specification Provider

The specification provider 114 allows the software provider server 110 to retrieve records of previously constructed versions of requested software to make fulfilling the software requests more efficient. For widely used hardware and software configurations, along with popular user preferences, the specification provider 114 provides a consistent experience across a plurality of similar user devices.

Once the metadata of the user device is known, the specification provider 114 is configured to compare the metadata to stored metadata of other user devices that have previously requested the same software being requested by the requesting user device. All or part of the metadata may be compared. For instance, in some embodiments, only the hardware and software configurations are compared. In other instances, at least a portion of the current state information and/or the user preferences are compared.

The specification provider 114 then determines whether there is a match between any of the other user devices and the requesting user device. To qualify as a match, at least some of the metadata from the two user devices must match (e.g., display type, input devices, etc.). The match is determined using a number of techniques known to those in the art. According to embodiments, software templates specify attribute type (such as the types of eligibility attributes) and a comparison function to use for an indicated attribute and/or attribute type. According to embodiments, eligibility attributes include metadata indicating type and/or comparison function to use. In some embodiments, the component manager 116 may determine if there is a match.

To illustrate, user device metadata matches when metadata between the two user devices is one or more of: identical (e.g., one user device's display resolution of "1080p" is identical to another user device's display resolution of "1080p"); values associated with the metadata are within a pre-defined range or margin; identified in mapping data as matching; etc. To illustrate, processor speed can be a float value and can be compared using equality.

Mapping data is data that is accessible to specification provider 114 that identifies various components of user device metadata that are not identical, but that nevertheless match. For example, mapping data indicates that one user device's display resolution of "1080p" matches another user device's display resolution of "1920×1080 pixels". For another example, mapping data indicates that a device's processor of type "Intel Core i5" matches a device's processor of type "AMD FX-8350".

According to embodiments, mapping data identifies ranges of values of user device metadata, where metadata values within the range are considered matching. For example, mapping data indicates that user devices having from 1 GB to 2 GB of RAM match. Based on this mapping data, specification provider 114 determines that metadata indicating a user device having 1 GB of RAM matches metadata indicating a user device having 1.5 GB of RAM.

When it is determined that there is a matching user device, the specification provider 114 accesses a stored record describing the software previously provided to the matching user device. The specification provider 114 then identifies the components included in the previous version of the software for construction by the component manager 116, as described in further detail below. According to embodiments, specification provider 114 records information about user devices that have matched stored specifications. For example, specification provider 114 records one or more of: a number of times the specification has matched user devices, a number of unique user devices that have matched the specification, common differences between the user device described by the specification and user devices that match the specification, etc.

Component Manager

If there is no matching user device, and thus no existing record of a previously constructed version of the software, the component manager 116 is configured to select components for the selected software according to a template of the selected software. Component manager 116 constructs the requested software from the selected components, and sends the software to the requesting user device. A copy of the component manager 116, or a client-specific software manager, can be downloaded to the user device as part of the requested software. In embodiments, the client-side component manager installed on a user device detects hardware and/or software changes in the user device. The client-side component manager provides information about detected changes to the component manager 116 on software provider server 110. Component manager 116 parses the information from the client-side component manager to assemble requested software, as described in further detail below.

To select components for requested software, the component manager 116 identifies a template, corresponding to the software requested, from a plurality of stored software templates. A software template comprises a set of one or more categories of software components that are to be included in the software. According to embodiments, the template further dictates one or more of: how many components from each category are to be included in the assembled software, how the components are assembled, one or more optional categories or components that can be included in the software but that are not necessary in all circumstances, one or more particular components to include in the software, etc. The template can include, for example, a requirement that a copy of the component manager 116 and the update manager 120 be included in the software.

In an example embodiment, a template identified by component manager 116 includes instructions that the software include a client-side component manager, a client-side update manager, and one software component from each of five categories (e.g., C1, C2, C3, C4, and C5). According to another embodiment, a client-side component manager is included in requested software regardless of whether the software template dictates that the client-side component manager be included.

Each software component in component repository database 122 is associated with at least one category. A category of a software component identifies the functionality that the component is configured to perform. For example, the software components in component repository database 122 that are associated with category C1 are display components that are configured to cause the user device to display graphical user interfaces for the installed software.

The component manager 116 is configured to select software components, from component repository database 122, for each of the five categories indicated in the identified template. To select the components, the component manager 116 accesses the component registry 118. The component registry 118 provides access to eligibility attributes of each of the available components in component repository database 122. Eligibility attributes of a particular component identify aspects of a user device on which the component is configured to run. For example, eligibility attributes include one or more of: a feature list, storage space, computing requirements, display requirements, etc. For example, a particular component is associated with eligibility attributes that indicate that the component is configured to run on a user device with a display that has a resolution of 1080p or greater. The component registry 118 further registers components to, and deregisters components from, the user devices.

By comparing the eligibility attributes of the software components, in component repository 122, to the metadata of the user device, the component manager 116 selects the most appropriate component for the requesting user device in each needed category. Further, the component manager 116 is configured to determine whether to include optional components, or components from optional categories, based on eligibility attributes of the optional components or categories and/or user device metadata.

Once all of the needed components are selected (either based on a previous configuration of the software or based on selection of software components by the component manager 116), the component manager 116 is configured to construct the software. The component manager 116 retrieves the selected components from the component repository 122 and assembles them into a downloadable software file. Software provider server 110 constructs the downloadable software file according to any technique, within embodiments. The component manager 116 then transmits, via the network 108, the constructed software to the user device for which the software was requested.

As part of the run time assembly, the component manager 116 records which of the different components are used or requested. These records are stored in a system repository (not depicted). Once these records are analyzed, frequency data describing which components are downloaded more than others can be communicated to device manufacturers. In some instances, the device manufacturers may use this data to determine the market demand for various capabilities or configurations. Same use-case data can be used by the software application developers to ensure that the provided software supports components that are most in demand by users. For example, every time a user requests software that renders HD video, there is a counter tracking downloads of the corresponding component. The count maintained by the counter can then be used to determine which of the available components are most popular. This determination can be provided to device manufacturers to illustrate the market demand for supporting GPU acceleration to render HD video and to application developers to ensure that they have a component and content available for HD rendering.

Update Manager

After the software is received and installed on the user device 102, 104, or 106, changes to the user device, software template, and/or software components may change the optimal configuration of software components in the installed software. The update manager 120 is configured to detect a change warranting an update, and to replace one or more components in the software configuration for a particular user device.

A change in a user device, such as user device 102, may cause the optimal configuration of software that was previously downloaded to the user device to change. A change in a user device may be a change in: the hardware configuration of the user device, the system software configuration of the user device, current state information, user preferences, and known user priorities, etc. For example, user device 102 changes when a user adds new memory to user device 102.

Update manager 120 may detect a change in a user device in a variety of ways. In instances where a client-side update manager is installed on the user device (e.g., as part of previously downloaded software), the client-side update manager is configured to detect a change in the user device, update the user device metadata, and notify update manager 120 of the changed metadata.

A change in a user device can trigger an update of software downloaded to the user device. For example, a client-side component manager installed on user device 102 detects a change in hardware or software configuration on user device 102 or a change in the current state of the user device 102 or a change in user preference. The client-side component manager sends notification of the detected change to component manager 116, which in turn notifies update manager 120 of the user device metadata change.

Update manager 120 determines whether the detected change warrants a software upgrade on user device 102. For example, update manager 120 evaluates the eligibility requirements of components of software currently installed on user device 102 and the eligibility requirements of software components, associated with the categories needed for the installed software, in component repository database 122. If any of the software components in component repository database 122 are a better fit for user device 102 based on the current metadata of user device 102 (with the detected change), then update manager 120 triggers an update for the software installed on user device 102.

For example, update manager 120 triggers an update upon receiving notification of a change in the amount of memory in user device 102. Examples of changes in the amount of available memory in user device 102 include, but are not limited to, addition of a Micro Secure Digital (SD) card to the user device 102, the performance of tasks to free-up memory (such as clearing cache memory or uninstalling other applications), etc. Specifically, update manager 120 receives notification that the available memory in user device 102 has increased from 200 MB to 2 GB.

In response to receiving the change notification, update manager 120 determines that user device 102 has particular software installed thereon (e.g., based on information about user device 102 in component registry 118). Update manager 120 determines that the particular software is based on a particular software template that dictates software components from categories C1, C2, and C3 be included in the particular software.

Update manager 120 determines whether any software components associated with categories C1, C2, and C3 in component repository database 122 are a better fit for the metadata of user device 102 (with the increased available memory) than the software components currently installed on user device 102. As described above, the capabilities of the user device 102 and the user preferences associated with the user device 102 are accessed. In some instances, a user preference may dictate whether the software is updated and/or whether one update is selected over another update. Upon determining that one or more components in component repository database 122 is a better fit for the metadata of user device 102, update manager 120 triggers an update of the installed software to replace the software components on user device 102 with the software components that are a better fit.

When an update is triggered, the client-side update manager sends a software request with the current metadata of the user device to update manager 120. Update manager 120 causes component manager 116 to re-select components for the requested software.

According embodiments, update manager 120 determines whether the re-selected components are the same as components in the software already installed on the user device. For example, update manager compares the re-selected components to the components in the software that is already installed on the user device (e.g., by referencing components registered to the user device in the component registry 118). If one or more of the re-selected components is different than the components in the installed software, then update manager 120 sends causes the installed software to be updated with the different components. In an embodiment, update manager 120 sends the updated component to the user device for inclusion in the installed software (i.e., as a replacement for the component's counterpart in the installed software). In this embodiment, the client-side software is configured to replace the component's counterpart in the installed software with the new component. In another embodiment, update manager 120 sends, to the user device, updated software including all of the re-selected components.

Furthermore, a change in the available components in component repository database 122, a change in a software template, and/or a change in eligibility attributes of a component can cause an update to occur. For example, an administrator registers a new software component in component registry 118, where the new software component is associated with category C2. In response to receiving the new registration, component registry 118 identifies a set of one or more software templates that include C2 software components. Component registry 118 then identifies, e.g., from a user device registry in component registry 118, one or more user devices on which software based on the one or more identified software templates are installed.

Component registry 118 requests update manager 120 to perform a software update evaluation for the identified software on the identified one or more user devices. Update manager 120 determines whether software components on the identified one or more user devices should be updated, as described above.

Based on the registrations stored by the component registry 118, affected user devices having the changed components or software generated from a now-changed template are identified. The affected user devices can be further interrogated for current metadata on which to base updated software. Based on the change and/or the current metadata, the update manager 120 can instruct the component manager 116 to re-select and re-assemble components to transmit to the user device.

Providing a Requested Download

Figure 2:
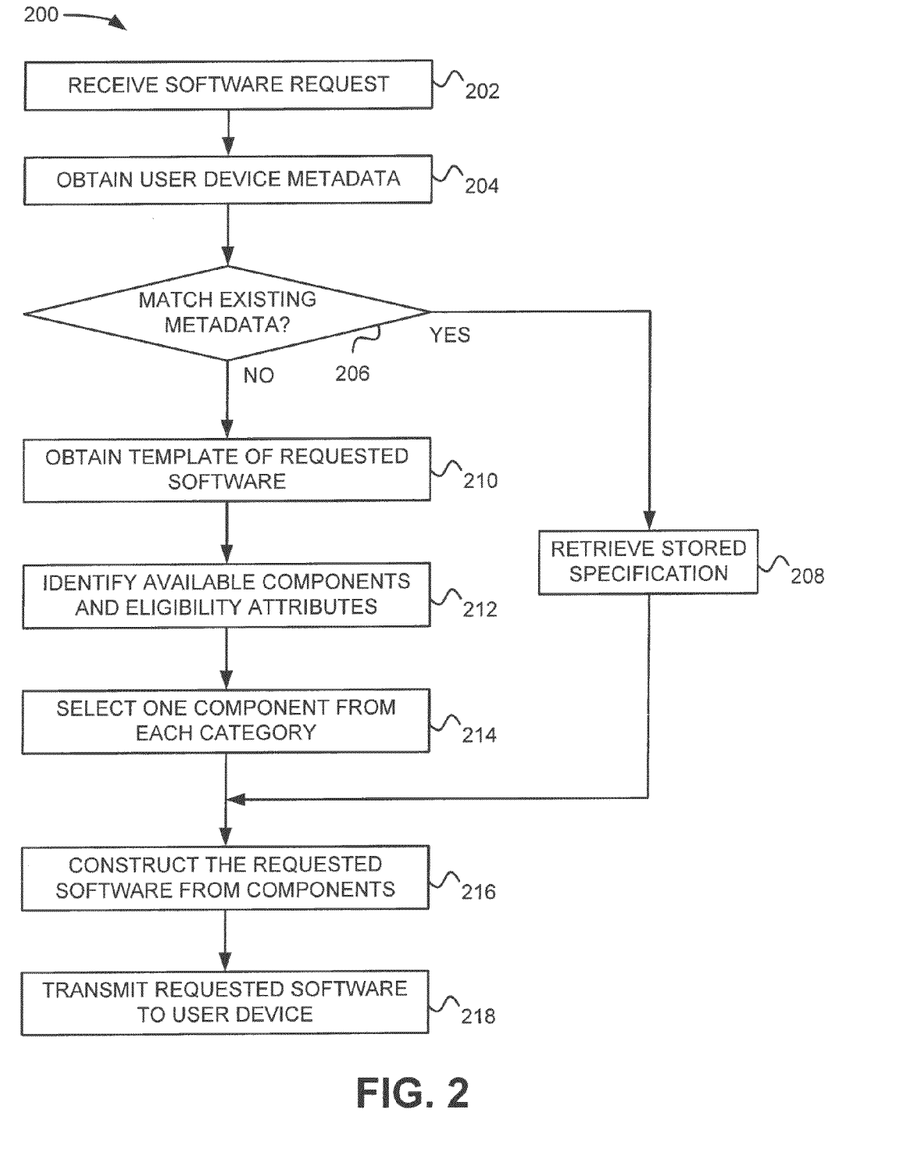
FIG. 2 depicts a flowchart for identifying components within a version of the requested software and constructing the requested software.

FIG. 2 depicts a flowchart 200 for identifying components within a version of the requested software and constructing the requested software. According to embodiments, the process of flowchart 200 is performed by the software provider server 110.

In an operation 202, a software request is received via a network from a user device. For example, user device 102 sends a request for software to be installed on user device 102. As a further example, user device 104 sends a request for software to be installed on user device 102. The request may include at least a portion of the metadata of user device 102. Request processor 112 receives the request for software to be installed on user device 102 via network 108.

In an operation 204, metadata of the user device is obtained. For example, request processor 112 obtains the metadata for user device 102 as part of the software request. As a further example, request processor 112 requests the metadata for client device 102 in response to receiving the software request. The metadata, as described above, includes one or more of: the hardware and/or software configuration of the user device, current state information of the user device, user preferences, and learned priorities.

In an operation 206, a determination is made as to whether the user device (or the metadata of the user device) matches an existing specification of another user device. For example, specification provider 114 determines whether the metadata for user device 102 matches an existing specification (including user device metadata) for user devices that have previously requested the presently requested software.

If there is matching existing metadata, the process shown in flowchart 200 proceeds to an operation 208 in which a stored specification is retrieved. The stored specification includes information identifying those software components that were included in software previously constructed for a user device having at least some of the same, or substantially similar, metadata as the requesting user device. The process shown in flowchart 200 then proceeds to operation 216, discussed below. The operation 208 can be performed by the specification provider 114.

If there is no matching existing metadata, the process shown in flowchart 200 proceeds to an operation 210 in which a template of the requested software is obtained. For example, component manager 116 identifies a software template for the software requested for user device 102. The identified software template dictates that the software include one component for each of the following categories: C1, C2, C3, C4, and C5.

In an operation 212, for each category of components dictated by the template, available components and their respective eligibility attributes are identified. In each category, the one or more components can vary in functionality, allocated compute resource, and other hardware and software requirements. Continuing with the previous example, component manager 116 identifies—for each of categories C1, C2, C3, C4, and C5 indicated in the software template—those software components in component repository database 122 that are associated with each category. In performing the operation 212, the component manager 116 can access data about the components in the component registry 118.

In an operation 214, one (or more depending on the template) components are selected from each category indicated in the template. For example, component manager 116 compares the eligibility attributes of the components within each category in the template to the metadata of user device 102.

According to embodiments, component manager 116 first determines which software components match user device metadata indicating hardware and software configurations. To illustrate, component manager 116 identifies two software components (component A and component B), in component repository database 122, that are associated with category C1. The eligibility requirements of component A indicate that the user must have at least a 1.8 GHz processor speed to run the component. The eligibility requirements of component B indicate that the user must have at least a 2.4 GHz processor speed to run the component. Component manager 116 determines, from the metadata of user device 102, that user device 102 has a 2.0 GHz processor. Component manager 116 determines that the metadata of user device 102 matches the eligibility requirements of component A and does not match the eligibility requirements of component B. Such a matching determination may be made as described above. In this example, component manager 116 determines that component A should be included in the software for user device 102 to fulfill category C1.

Component manager 116 refines software component matching based on other user device metadata. As an example that builds on the previous example, the metadata of user device instead indicates that user device has a 2.7 GHz processor. Thus, component manager 116 determines that the hardware metadata of user device 102 matches the eligibility requirements of both components A and B. In this situation, where user device hardware/software metadata matches multiple components, component manager 116 uses other metadata for user device 102 to select a component for the user device, such as user preference metadata. For example, the metadata for user device 102 indicates that the user prefers high-definition (HD) video. The eligibility requirements of component A indicate that the component only supports standard-definition video, and the eligibility requirements of component B indicate that the component supports any definition of video, including HD video. Because component B both matches the hardware metadata of user device 102 and the user preference metadata of user device 102, component manager 116 selects component B as the best fit C1 software component for user device 102.

The selection of the components can further be recorded by the specification provider 114 for later retrieval. For example, in the case that there was no matching specification for the requesting user device, specification provider 114 records a new specification that includes information identifying the requested software, at least part of the metadata of user device 102, and information identifying the software components selected for inclusion in the software.

In an operation 216, the requested software is constructed from the components selected in the operation 214 or in the stored specification of the operation 208. For example, component manager 116 retrieves a copy of each of the components from the component repository database 122 and registered in the component registry 118. Component registry 118 provides an interface to register and unregister software components. Components are registered with associated eligibility metadata attributes including one or more of: feature list, storage, compute, display, comparison function, etc.

Component manager 116 generates a downloadable version of the software that includes the selected software components. For example, component manager 116 packages a downloadable version of the requested software based on the operating system of the requesting user device. For example, metadata for the requesting user device indicates that the user device runs an Android operating system. Component manager 116 uses the APK packager, which is configured to package software for the Android operating system. As a further example, the requesting user device runs IOS, and component manager 116 uses one of the supported package managers. Specifically, component manager 116 uses the identified package manager's API to assemble the selected software components for the requested software. When assembled, the components can communicate with one another using a shared API.

In an operation 218, the requested software is transmitted to the user device via the network 108. For example, component manager 116 transmits the downloadable version of the assembled software to user device 102 as a response to the request for the software.

Example Implementations

FIGS. 3A-3D depict example user device capabilities and corresponding software sent to the user device. In each of the FIGS. 3A-3D, pictorial representations of the metadata of the user device is depicted on the left side of the figure (e.g., metadata 300, 320, 340, and 360), and a pictorial representation of the software provided to the user device is depicted on the right side of the figure (see, e.g., representations 302, 322, 324, and 326).

As shown, the metadata is depicted in terms of a relative processing power shown as a set of processors, a relative amount of memory, and a depiction of the user interface. The pictorial representation of the software includes a client-side component manager (labelled "CM") and five wedge-shaped components (labelled according to its category, C1-C5) positioned about the client-side component manager. The relative size of each of the five wedge-shaped components is representative of the eligibility attributes of the respective component. To illustrate, the five categories in the software are: display type (e.g., including components supporting retina display, LED, and LCD); input devices (e.g., including components supporting touch screen, keyboard, scanner, and mouse); supported file types (e.g., including components for supporting MPEG, MP4, MP3, PDF, TXT, and DOC files); computing (e.g., including components supporting 32 bit processing and 64 bit processing); and database types (e.g., including components supporting access to SQLite, and DB2 databases).

Each of the five software components selected for inclusion in the software for the user device with the capabilities represented in each of metadata 300, 320, 340, and 360 is selected based on the capabilities of the corresponding user device. To illustrate the tailoring of the components to the capabilities of the user device, each component in the corresponding software representation is depicted with distinctive proportions.

Figure 3A:
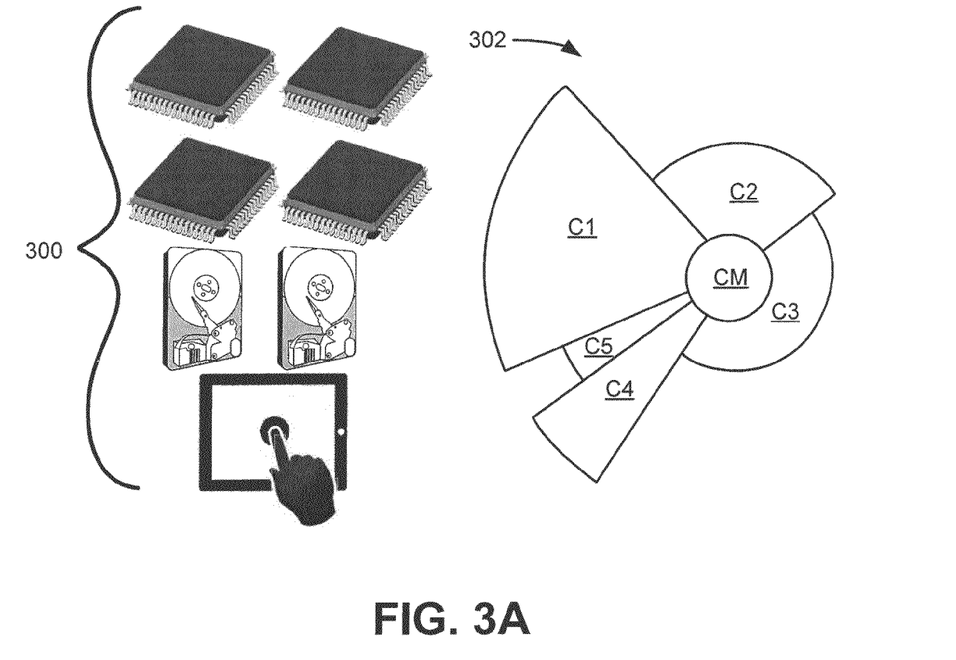
FIGS. 3A-3D depict example device capabilities and corresponding software sent to the user device.
Figure 3B:
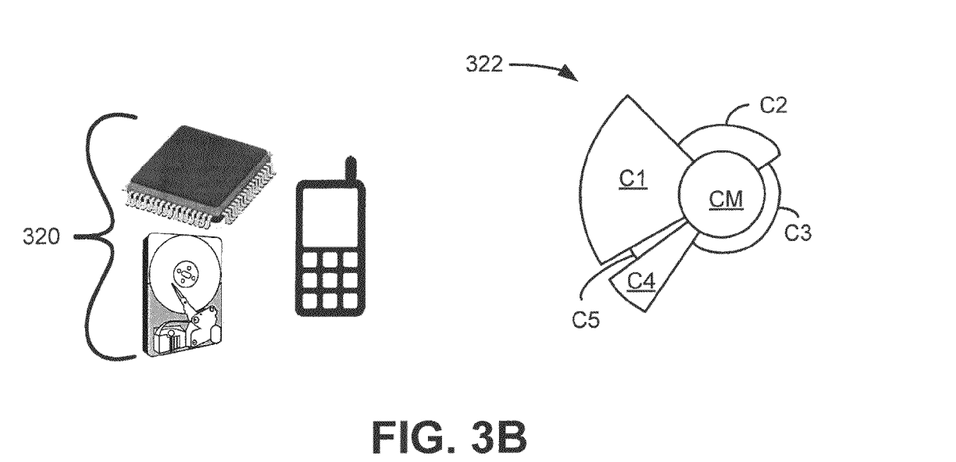

For example, as illustrated in FIG. 3A, the metadata 300 of the user device (e.g., user device 102, 104, or 106) indicates that the user device has 4× processing power, 2× memory, and has a tablet interface. In contrast, FIG. 3B depicts a smaller user device that, according to metadata 320, has 1× processing power, 1× memory, and has a feature phone interface. Accordingly, representation 302 depicts a larger software (taking up more resources) than the software depicted in representation 322. Specifically, the software depicted in representation 322 comprises the configuration manager (labelled "CM") and one component from each of the same five categories (labelled C1-C5). The components of FIG. 3B are significantly smaller than those of FIG. 3A, indicating that they require fewer resources than the components in FIG. 3A and can be executed by a user device having less powerful resources.

Figure 3C:
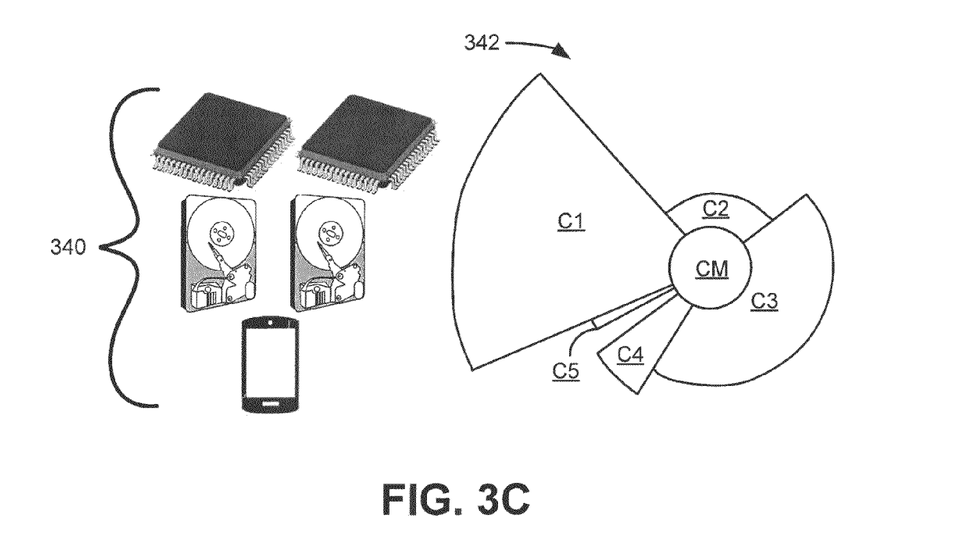

In FIG. 3C, a user device is pictured that, according to the metadata 340, has 2× processing power, 2× memory, and has a smart phone interface. The representation 342 illustrates that the software provided comprises the configuration manager (labelled "CM") and one component from each of the same five categories (labelled C1-C5). The components of FIG. 3C are a mix of the larger components of FIG. 3A (see, e.g., components labelled C1 and C3 of FIG. 3C) and the smaller components of FIG. 3B (see, e.g., components labelled C2, C4, and C5 of FIG. 3C). Thus, the components are selected so as to run effectively on the designated user device.

Updating Software

Figure 3D:
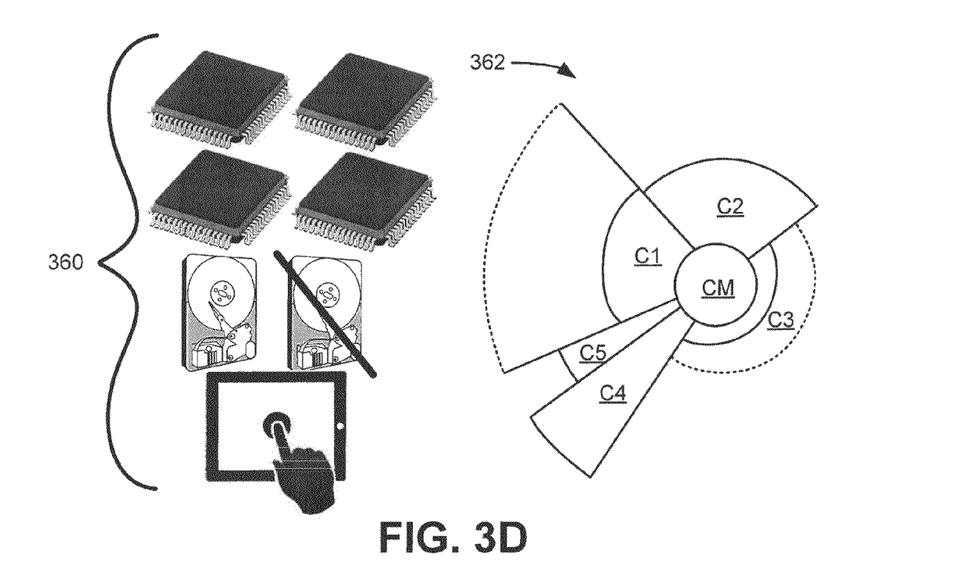

In FIG. 3D, an example in a change in hardware configuration of the user device of FIG. 3A is depicted. The user device pictured, according to the metadata 360, has 4× processing power, 1× memory (where one of two previously-available memories has been removed from the user device), and has a tablet interface. The representation 362 illustrates that the software provided comprises the configuration manager (labelled "CM") and one component from each of the same five categories (labelled C1-C5). In the representation 362, the dotted lines indicate where "larger" components have been replaced by "smaller" components depicted using solid lines (see, e.g., components labelled C1 and C3). Thus, the components are updated in response to the change in memory in the user device.

Figure 4:
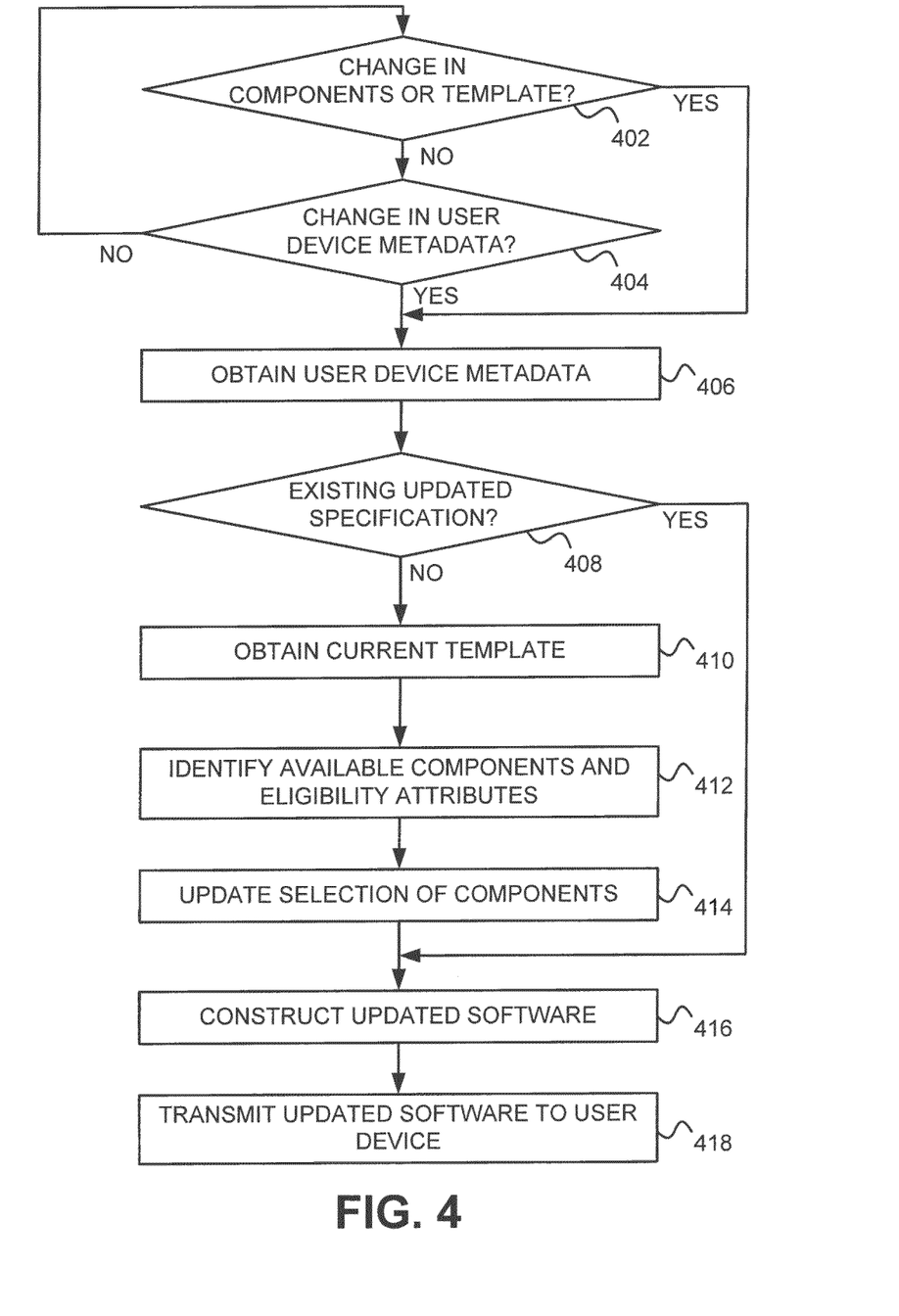
FIG. 4 depicts a flowchart for updating software previously assembled and downloaded to the user device.

FIG. 4 depicts a flowchart 400 for updating software previously assembled and downloaded to a user device. The update can be triggered by a change in the software template or in components in component repository database 122 or by a change in user device metadata, etc. The process shown in the flowchart 400 can be performed by the software provider server 110 or by the user device 102, 104, or 106.

In an operation 402, a determination is made as to whether there has been a change in the components available to be downloaded to the user device, in the eligibility attributes of the components, or in the template used to assemble the components. Such determination is, for example, performed by update manager 120 inspecting the software and components that are registered in the component registry 118 to identify changes in the registered software components.

As another example, an administrator registers a new software component (in component repository database 122) with component registry 118 by providing, to component registry 118, information that identifies the new software component and also the eligibility attributes of the new software component. In response to receiving the registration, component registry 118 sends notification of the new software component to update manager 120. Upon receiving such notification, update manager 120 detects the change in the software components on component repository database 122.

As yet another example, an administrator registers a replacement template configured to replace a now-obsolete template with component registry 118 by providing, to component registry 118, information that identifies the new template and the now-obsolete template that the new template is configured to replace. In response to receiving the registration, component registry 118 sends notification of the new template to update manager 120. Upon receiving such notification, update manager 120 detects the change in the now-obsolete software template.

If a changed is detected, the process of flowchart 400 proceeds to an operation 406, discussed below.

If no change is detected in the operation 402, in an operation 404 a determination is made as to whether there has been a change in metadata of the user device. In some instances, the client-side configuration manager can asynchronously notify the software provider server 110 of changes on a user device. The change can be a change in hardware or software configuration, a change in the current state of the user device, a change in user preferences, and/or a change in explicit or learned user priorities as described above. The determination of the operation 404 can be performed by, for example, a client-side update manager or the update manager 120. If no change is detected in the metadata of the user device or in the software provided, the process of flowchart 400 returns to the operation 402.

In an operation 406, if a change is detected in either the metadata of the user device or in the components or template, then current metadata of the subject user device is obtained. For example, in the case of a change in template or software component, update manager 120 identifies one or more subject user devices by identifying which user devices, of a plurality of user devices (e.g., user devices 102, 104, and 106), have previously downloaded the software constructed with the now-obsolete component(s) or template. In the case of a change in a user device, the subject user device is already known.

Update manager 120 obtains the metadata of the one or more subject user devices, either by sending a request for metadata to the one or more subject user devices, or via the notification of the change in the subject user device (which may contain the changed metadata for the subject user device). The current metadata of the user device may be the same as the previously obtained metadata of the user device (e.g. obtained in the operation 204 of flowchart 200, discussed above) or may be different from the previously obtained metadata (e.g., if there is a determination that the metadata has changed in the operation 404). In the operation 406, the current metadata of the user device can be obtained in whole or in part (e.g., as a differential of previously obtained metadata and the current metadata). The operation 406 can be performed by the update manager 120 and/or the request processor 112.

In an operation 408, a determination is made as to whether there is an existing updated specification. As discussed above, existing specifications are maintained by the specification provider 114 for user devices that have previously downloaded software. The new metadata of the subject user device may match the metadata of a user device in an existing specification that has previously downloaded the applicable software. If a match is found, the process of the flowchart 400 proceeds to an operation 416, discussed below. The operation 408 can be performed, for example, by the update manager 120.

If no match to an existing specification is found, the process of flowchart 400 proceeds to an operation 410, in which a current template is obtained. The current template may be the same template obtained in the operation 210 of flowchart 200 or may be an updated version of the template obtained in the operation 210. The operation 410 can be performed, for example, by the update manager 120.

In an operation 412, available components and their respective eligibility attributes are identified. The operation 412 may be performed in much the same way as the operation 212 of the flowchart 200. The operation 412 can be performed, for example, by the update manager 120.

In an operation 414, the selection of components is updated. In instances where the metadata of the user device has changed, the available components may not have changed since the software was last downloaded. In these instances, a different component is selected as described herein. In other instances, where the components or template has changed, an updated or new component is selected based on information stored in the component registry 118. In some instances, the selection of components and at least a portion of the metadata may be stored by the specification provider 114 as an existing updated specification. The operation 414 can be performed, for example, by the update manager 120.

In an operation 416, the updated software, or a portion of the updated software, is constructed. In instances where the template is updated or where one or more of the components have changed, the entire software, including all of the components, can be re-constructed. In instances where one or more of the components are updated, the components can be downloaded to the subject user device without re-constructing the entirety of the software download. The operation 416 can be performed, for example, by the update manager 120.

In an operation 418, the updated software, or a portion thereof, is transmitted to the user device. In instances where only a portion of the software is sent, a client-side component manager or a client-side update manager can construct the software at the user device. The operation 418 can be performed, for example, by the update manager 120.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
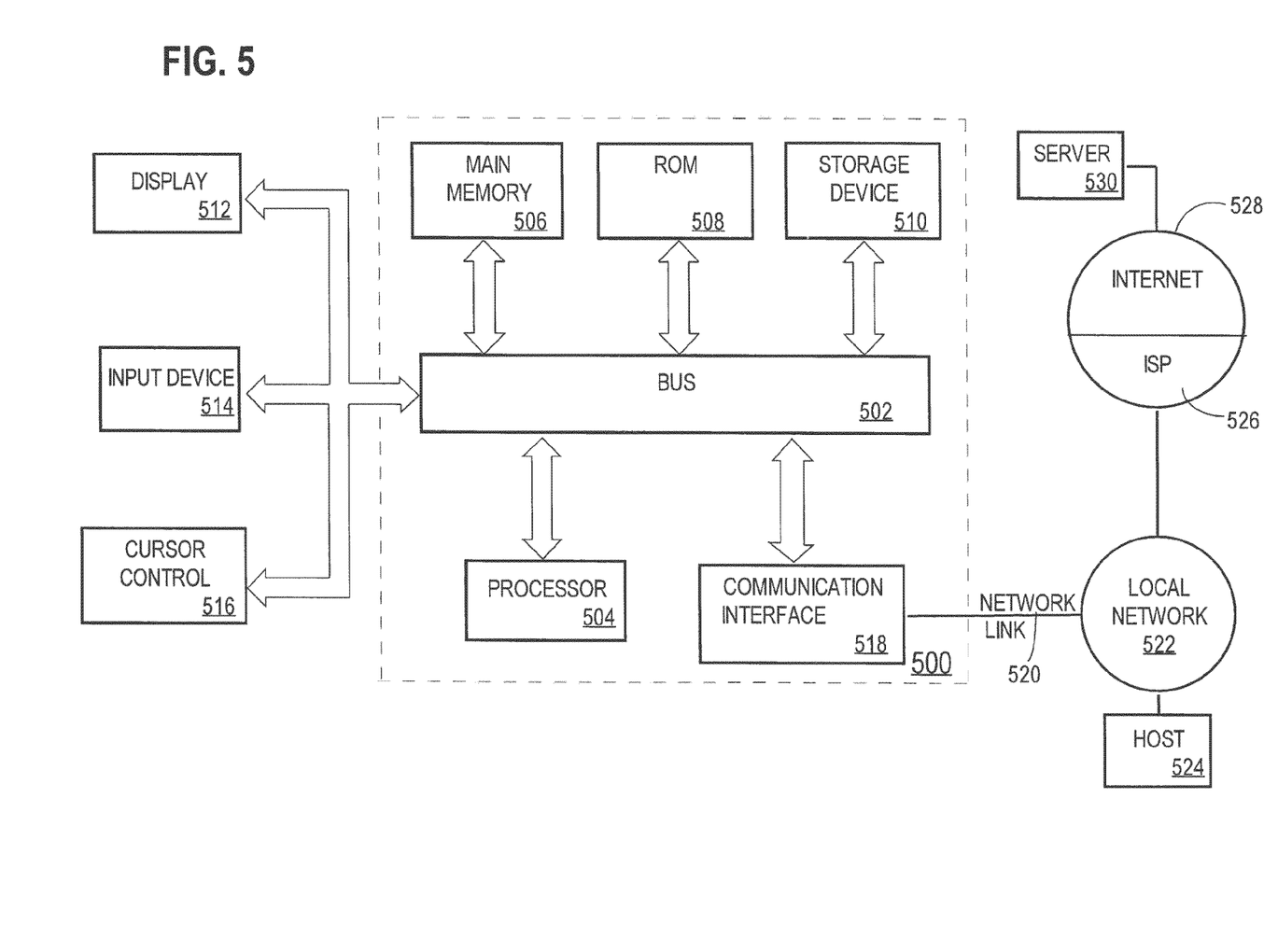
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A software provider system comprising:
a hardware processor;
a request processor configured to:
receive a software request from a user device; and
in response to receiving the software request, access metadata of the user device; and
a component manager configured to fulfill the software request by:
accessing a software template that defines a plurality of software categories for inclusion in the requested software;
wherein each of the plurality of software categories is associated with one or more components in a component repository;
wherein metadata for each component in the component repository includes one or more eligibility attributes for the component;
for each of the plurality of software categories defined in the software template, selecting a particular component, from the one or more components in the component repository that are associated with the software category, based at least in part on:
the metadata of the user device, and
the one or more eligibility attributes for the particular component;
constructing software for the software request that includes the particular selected components; and
transmitting the constructed software to the user device as a response to the software request;
an update manager configured to:
detect a change in eligibility attributes in metadata for components in the component repository;
access the software template;
for one or more of the plurality of software categories defined in the software template, select an updated component, from the one or more components in the component repository that are associated with the software category, based at least in part on:
the changed eligibility attributes, and
the metadata of the user device;
construct updated software that includes the updated selected components; and
transmit the constructed updated software to the user device.

2. The software provider system of claim 1, wherein the component manager is further configured to:
receive notification of a change in the metadata of the user device, the notification comprising at least a portion of the metadata of the user device;
access the software template;
for one or more of the plurality of software categories defined in the software template, select different component, from the one or more components in the component repository that are associated with the software category, based at least in part on:
the change in metadata of the user device, and
the one or more eligibility attributes for the different component;
construct updated software that includes the selected different component; and
transmit the constructed updated software to the user device as a response to received notification of the change in the metadata of the user device.

3. The software provider system of claim 1, further comprising a component registry configured to:
receive registration information for a certain component;
wherein the registration information for the certain component includes one or more eligibility attributes of the certain component; and
include the certain component in the component repository.

4. The software provider system of claim 1, wherein the metadata of the user device comprises one or more of: user device hardware configuration, current state information of the user device, or user preferences.

5. The software provider system of claim 4, wherein the user preferences comprise one or more of: reduced power consumption, improved user interface, performing operations locally, and override of hardware configurations.

6. The software provider system of claim 1, further comprising:
a specification provider configured to:
store at least a portion of the metadata of the user device, wherein the user device is a first user device, and information indicating components included in the constructed software for the first user device;
receive information indicating a second software request from a second user device;
wherein the information indicating the second software request includes metadata of the second user device;
determine that the metadata of the second user device is similar to the metadata of the first user device;
in response to determining that the metadata of the second user device is similar to the metadata of the first user device, provide the information indicating the components included in the constructed software for the first user device to the component manager;
wherein the component manager is further configured to:
receive the information indicating the components included in the constructed software for the first user device;
construct second software for the second software request that includes the components included in the constructed software for the first user device; and
transmit the second constructed software to the second user device as a response to the second software request.

7. The software provider system of claim 1, wherein the one or more categories comprise one or more of: display types, input devices, supported file types, computing resources, and supported databases.

8. The software provider system of claim 1, wherein each component in the component repository is configured to communicate with one or more other components in the component repository via a standard application programming interface (API).

9. A method comprising:
receiving a software request from a user device;
in response to receiving the software request, accessing metadata of the user device; and
fulfilling the software request by:
accessing a software template that defines a plurality of software categories for inclusion in the requested software;
wherein each of the plurality of software categories is associated with one or more components in a component repository;
wherein metadata for each component in the component repository includes one or more eligibility attributes for the component;
for each of the plurality of software categories defined in the software template, selecting a particular component, from the one or more components in the component repository that are associated with the software category, based at least in part on:
the metadata of the user device, and
the one or more eligibility attributes for the particular component;
constructing software for the software request that includes the particular selected components; and
transmitting the constructed software to the user device as a response to the software request;
detecting a change in eligibility attributes in metadata for components in the component repository;
accessing the software template;
for each of the plurality of software categories defined in the software template, selecting an updated component from the one or more components in the component repository that are associated with the software category, based at least in part on:
the changed eligibility attributes, and
the metadata of the user device;
constructing updated software that includes the updated selected components; and
transmitting the constructed updated software to the user device as a response to the change in the metadata of the user device.

10. The method of claim 9, further comprising:
receiving notification of a change in the metadata of the user device, the notification comprising at least a portion of the metadata of the user device;
accessing the software template;
for each of the plurality of software categories defined in the software template, selecting an updated component from the one or more components in the component repository that are associated with the software category, based at least in part on:
the change in metadata of the user device, and
the one or more eligibility attributes for the particular component;
constructing updated software that includes the updated selected components; and
transmitting the constructed updated software to the user device as a response to the change in the metadata of the user device.

11. The method of claim 9, further comprising:
receiving registration information for a certain component;
wherein the registration information for the certain component includes one or more eligibility attributes of the certain component; and
including the certain component in the component repository.

12. The method of claim 9, wherein the metadata of the user device comprises one or more of: user device hardware configuration, current state information of the user device, or user preferences.

13. The method of claim 12, wherein the user preferences comprise one or more of: reduced power consumption, improved user interface, performing operations locally, and override of hardware configurations.

14. The method of claim 9, further comprising:
storing at least a portion of the metadata of the user device, wherein the user device is a first user device, and information indicating components included in the constructed software for the first user device;
receiving information indicating a second software request from a second user device;
wherein the information indicating the second software request includes metadata of the second user device;
determining that the metadata of the second user device is similar to the metadata of the first user device;
in response to determining that the metadata of the second user device is similar to the metadata of the first user device, providing the information indicating the components included in the constructed software for the first user device to the component manager;
wherein the component manager is further configured to:
receive the information indicating the components included in the constructed software for the first user device;

construct second software for the second software request that includes the components included in the constructed software for the first user device; and transmit the second constructed software to the second user device as a response to the second software request.

15. The method of claim 9, wherein the one or more categories comprise one or more of: display types, input devices, supported file types, computing resources, and supported databases.

16. The method of claim 9, wherein each component in the component repository is configured to communicate with one or more other components in the component repository via a standard application programming interface (API).

17. One or more non-transitory computer-readable media storing one or more sequences of instructions which, when executed by one or more processors, cause performance of steps comprising:

receiving a software request from a user device;

in response to receiving the software request, accessing metadata of the user device; and fulfilling the software request by:

accessing a software template that defines a plurality of software categories for inclusion in the requested software;

wherein each of the plurality of software categories is associated with one or more components in a component repository;

wherein metadata for each component in the component repository includes one or more eligibility attributes for the component;

for each of the plurality of software categories defined in the software template, selecting a particular component, from the one or more components in the component repository that are associated with the software category, based at least in part on:

the metadata of the user device, and the one or more eligibility attributes for the particular component;

constructing software for the software request that includes the particular selected components; and transmitting the constructed software to the user device as a response to the software request;

detecting a change in eligibility attributes in metadata for components in the component repository;

accessing the software template;

for each of the plurality of software categories defined in the software template, selecting an updated component from the one or more components in the component repository that are associated with the software category, based at least in part on:

the changed eligibility attributes, and the metadata of the user device;

constructing updated software that includes the updated selected components; and transmitting the constructed updated software to the user device as a response to the change in the metadata of the user device.

18. The one or more non-transitory computer-readable media of claim 17, wherein the one or more sequences of instructions further comprise instructions for:

receiving notification of a change in the metadata of the user device, the notification comprising at least a portion of the metadata of the user device;

accessing the software template;

for each of the plurality of software categories defined in the software template, selecting an updated component from the one or more components in the component repository that are associated with the software category, based at least in part on:

the change in metadata of the user device, and the one or more eligibility attributes for the particular component;

constructing updated software that includes the updated selected components; and transmitting the constructed updated software to the user device as a response to the change in the metadata of the user device.

* * * * *